United States Patent [19]
Tetu

[11] Patent Number: 5,152,937
[45] Date of Patent: Oct. 6, 1992

[54] PROCESS FOR MANUFACTURING A COMPOSITE BUILDING PANEL FOR USE IN A BUILDING STRUCTURE CLADDING SYSTEM

[75] Inventor: Bertrand Tetu, St-Agapit, Canada

[73] Assignee: Panneaus Thermo-Briques, Inc., Quebec, Canada

[21] Appl. No.: 735,329

[22] Filed: Jul. 24, 1991

Related U.S. Application Data

[62] Division of Ser. No. 448,670, Dec. 11, 1989, Pat. No. 5,061,161.

[51] Int. Cl.⁵ ............................................. B06B 1/02
[52] U.S. Cl. ................................... 264/24; 156/79; 156/299; 264/46.5; 264/277
[58] Field of Search ................ 264/24, 35, 46.5, 261, 264/277, DIG. 31, DIG. 57; 425/3, 123, DIG. 33; 156/60, 79, 272.4, 299

[56] References Cited

U.S. PATENT DOCUMENTS

| | | | |
|---|---|---|---|
| 3,287,782 | 11/1966 | McClarney | 425/3 |
| 3,426,490 | 2/1969 | Taylor | 249/15 |
| 3,602,476 | 8/1971 | Iragorri | 249/96 |

FOREIGN PATENT DOCUMENTS

0865354 3/1971 Canada .
0911194 10/1972 Canada .

Primary Examiner—Michael W. Ball
Assistant Examiner—Daniel J. Stemmer
Attorney, Agent, or Firm—Helfgott & Karas

[57] ABSTRACT

A process for manufacturing a composite building panel of the type having a facing layer made from a plurality of facing elements, such as brick slices or stone slices, retained in a spaced apart relationship, and a magnetically attractable particulate material disposed between the facing elements to imitate mortar. In the process of making the building panel facing elements are placed in a holder having a plurality of recesses for receiving facing elements. Spacers are placed between said recesses for maintaining the facing elements in a spaced apart relationship. A magnetic field is generated in the vicinity of spacers for retaining thereto magnetically attractable particulate material. A backing layer is placed in a spaced apart relationship to the facing elements in the holder. A plastic material is then introduced between the facing elements and the backing layer for building an insulation layer.

1 Claim, 9 Drawing Sheets

FIG. 1

FIG_2

FIG. 3

FIG_5

FIG. 9 ary view taken along lines 2—2
PROCESS FOR MANUFACTURING A COMPOSITE BUILDING PANEL FOR USE IN A BUILDING STRUCTURE CLADDING SYSTEM This is a division of application Ser. No. 448,670, filed Dec. 11, 1989, now U.S. Pat. No. 5,061,161.

FIELD OF THE INVENTION

The present invention relates to the general field of construction materials and more particularly to a method and an apparatus for fabricating a composite building panel for use in a building structure cladding system.

BACKGROUND OF THE INVENTION

Cladding systems for building structures using composite building panels are an attractive alternative to conventional sheeting methods such as bricking because such cladding systems have improved thermal insulation characteristics and are very easy to erect.

Commercially available cladding systems are constituted by a set of building panels glued or attached with fasteners to the building structure. The panels are flat and comprise a rigid backing layer made of wood, a facial layer formed by brick or stone slices to give the appearance of a brick or stone wall, and an insulation layer between the facial and backing layers which also acts as a bonding medium retaining the constituent elements of the panel together. The panel is manufactured by a molding technique where the facing and backing layers are maintained in a spaced apart relationship in a special fixture, and plastic material in fluid state is injected therebetween, forming the insulation/bonding layer.

This type of building panels are particularly advantageous and easy to use for covering flat walls. However, a problem arises when the panels must be joined at a corner of the building structure. The technique employed in this case is to create a miter joint where each panel is beveled at 45° and adjacent panels are bonded by means of an adhesive. This technique is not satisfactory because often the joint is aesthetically unacceptable and partially defeats the purpose of the cladding system where it is desired to imitate as close as possible the appearance of conventional brick or stone walls. In addition, the joint at the corner may fail due to deterioration of the adhesive material as a result of exposure to the elements, which will allow water to infiltrate the building structure causing substantial damage.

OBJECT AND STATEMENT OF THE INVENTION

An object of this invention is to provide an improved method and a device for manufacturing building panels, preferably non-planar panels, for use on corners or other non-planar wall sections of a building structure.

In one aspect, the invention provides a fixture for use in manufacturing a composite building panel of the type comprising a facing layer made from a plurality of facing elements, such as brick slices or stone slices for example, retained in a spaced apart relationship, and a magnetically attractible particulate material disposed between the facing elements to imitate mortar. A rigid backing layer is provided, spaced from the facing layer, the space between the facing and backing layers being filled with an insulation/bonding layer, for example urethane foam.

The fixture for use in manufacturing this panel comprises a facing elements holder in the form of a structure with a plurality of recesses for receiving therein the facing elements, also including spacers between the recesses in order to maintain the facing elements in a spaced apart relationship. Means for generating a magnetic field in the vicinity of the spacing elements is provided in order to magnetically attract and retain the particulate material between the facing elements.

This arrangement is particularly advantageous for manufacturing non-planar building panels, such as shaped at the right angle. In this instance, the facing elements holder is L-shaped, having two sections meeting at a right angle, one of the sections being oriented generally horizontally and the other one extending vertically. The magnetic attraction retains against gravity the particulate material in the vertical section of the holder until the plastic core is injected for permanently bonding the panel elements together.

In a preferred embodiment, the fixture is also provided with a clamping assembly for holding the backing panel spaced apart from the facing elements in the holder. The cavity defined between the facing elements and the backing panel is used for receiving plastic material in fluid state forming the insulation/bonding layer.

According to the present invention there is provided a method for manufacturing a building panel comprising:

a facing layer including a plurality of facing elements in a spaced apart relationship, and a magnetically attractible particulate material disposed between the facing elements;

a relatively rigid backing layer spaced apart from the facing layer; and an insulation/bonding layer between the facing layer and the backing layer, the method comprising the steps of:

a) placing facing elements in a facing elements holder including a plurality of recesses for receiving therein facing elements, and spacing means between the recesses for maintaining the facing elements in a spaced apart relationship;

b) generating a magnetic field in the vicinity of the spacing means for retaining thereto magnetically attractible particulate material;

c) placing a backing layer in a spaced apart relationship to the facing elements in the facing elements holder; and d) flowing plastic material between the facing and backing layers to form the insulation/bonding layer.

DESCRIPTION OF A PREFERRED EMBODIMENT

Figure 1:
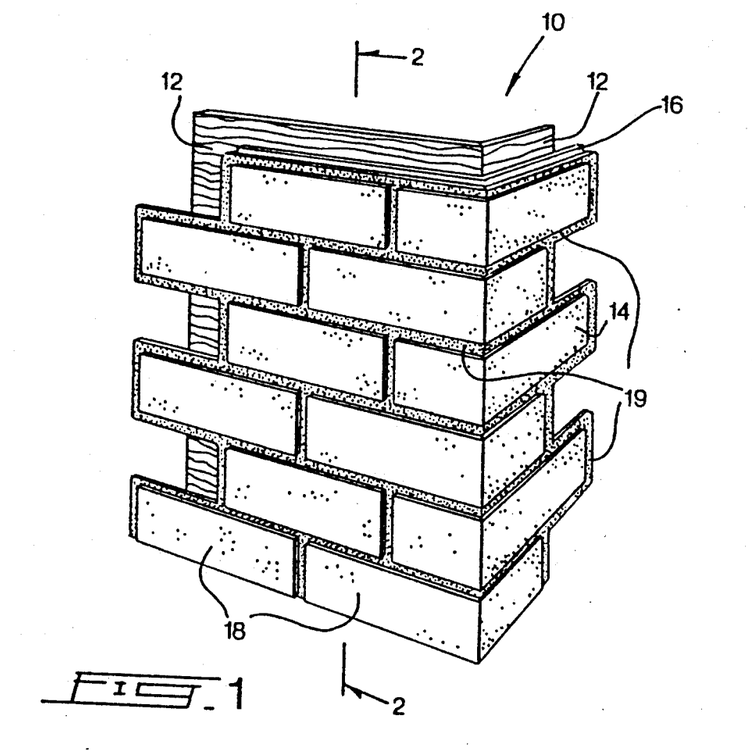
FIG. 1 is a perspective view of a building panel shaped at a right angle, according to the present invention.
Figure 2:
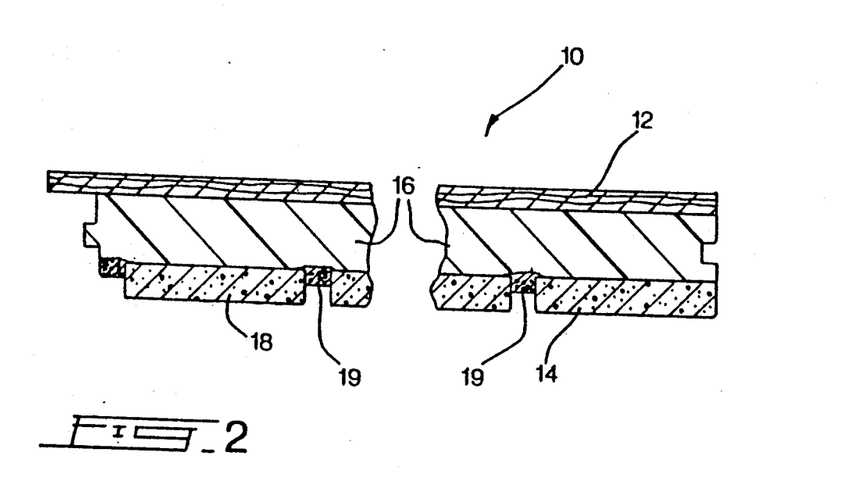
FIG. 2 is a cross-sectional view taken along lines 2—2 in FIG. 1.

A building panel constructed in accordance with the present invention is illustrated in FIGS. 1 and 2 of the annexed drawings. The building panel 10, the so called "brick veneer" is employed in a cladding system for a building structure.

Cladding systems using brick veneer panels are old in the art; Canadian patents numbers 865,354 and 911,194 issued on Mar. 9, 1971 and Oct. 3, 1972, respectively, granted to Dupont of Canada Limited, describe such systems which use only flat panels to cover a building structure. This is a disadvantage because the joints between adjacent panels over a corner of the building structure are difficult and time consuming to make and aesthetically they may not be satisfactory.

The present invention provides a method and an apparatus for constructing a non-planar building panel such as the one illustrated in FIG. 1 which is shaped at a right angle and is specifically adapted to fit a corner of a building structure where the walls meet at approximately 90°. It will be appreciated that this is not a limitation of the invention as the apparatus and the method may very well be used for manufacturing angular panels which are not shaped as a right angle, as well as for fabricating curved panels.

The panel 10 is a composite structure comprising a backing layer 12 made of wooden material, a facing layer 14 and an insulation/bonding layer 16 therebetween whose function is to retain together the constituent elements of the panel 10 as well as to form a thermal barrier.

The facing layer 14 of the panel is made by an assembly of facing elements, in this particular case, brick slices 18, which are slightly spaced from each other in order to give the appearance of a brick wall. The spaces between the brick slices 18 is filled with magnetically attractible granular material 19 such as magnetized limestone material of the type commercialized by the 3M Company under the product codes CX140600562 or CX140616816, having the appropriate mesh size for imitating mortar. Two different types of brick slices are used. The brick slices that are remote from the corner of the panel, are flat and are approximately ½" thick. Those on the corner itself have approximately the same thickness and they are L-shaped.

The various layers of the panel 10 are not flush at the edges to form a positive joint between adjacent panels when the cladding system is erected. More particularly, the backing layer 12 projects with respect to the insulation/bonding layer 16 and to the facing layer 14, by a predetermined amount from the top edge of the panel, the backing layer 12 being recessed by the same amount at the bottom edge of the panel to accomodate the projecting part of an adjacent panel. In addition, the lateral edges of the panels have recessed portions due to staggered relationship between brick slices 18 in adjacent rows.

The insulation/bonding layer 16 is preferably a urethane foam which is injected in a fluid state between the facing and backing layers of the panel 10, and which when cured, forms a bonding medium retaining the various components of the panel together.

The apparatus for manufacturing the panel 10 is illustrated in FIGS. 3 to 9. The apparatus 20 is a fixture comprising a base plate 22 which constitutes a holder for the brick slices 18 and for the granular material 19, to which is mounted a clamping assembly 24 used to retain the backing layer and the facing elements of the panel in their respective positions while the bonding layer is being built therebetween. The base plate 22, shaped at a right angle, comprises elongated channel like recesses 26 separated from each other by elongated upwardly projecting elements 28 which establish the spacing between adjacent rows of brick slices 18. Transverse separators to space block slices 18 in the same row from one another have not been found necessary in this set-up because each row has only two brick slices that will assume automatically their position one relative to the other when the fixture is closed. However, for a larger panel where the number of brick slices per row increases, transverse separators may be required.

Figure 5:
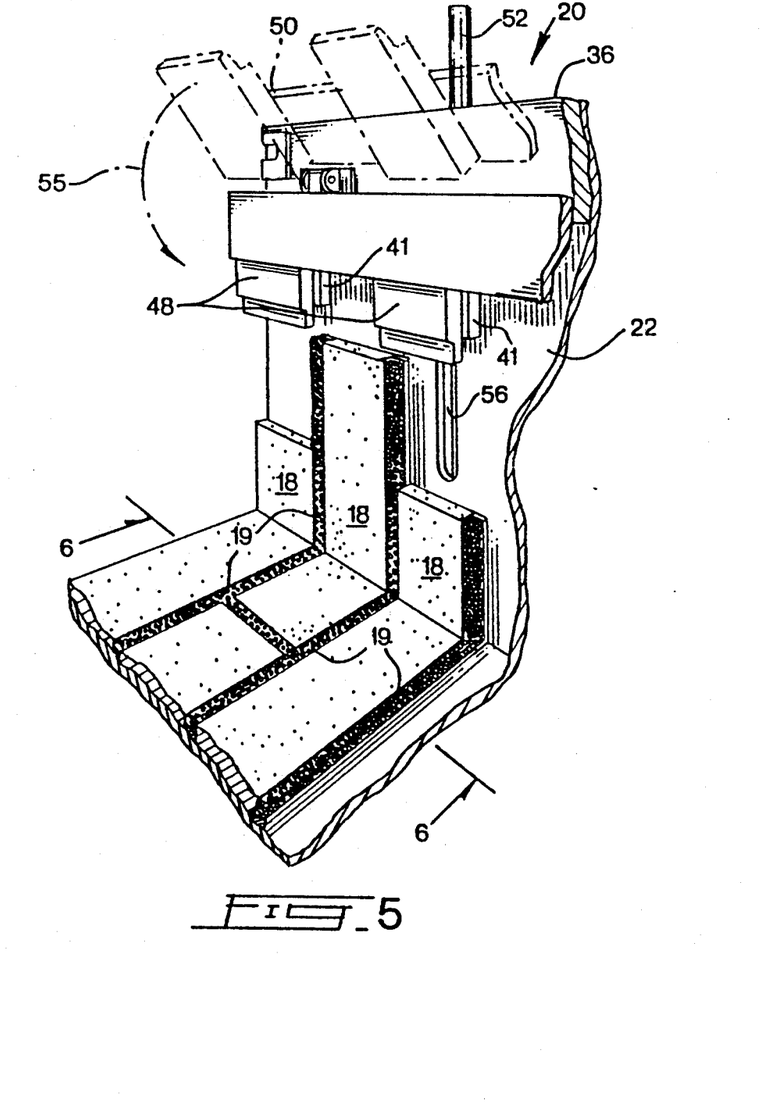
FIG. 5 is an enlarged partial view of the fixture of FIG. 3, illustrating in more detail the structure of the holder for the facing elements of the building panel.
Figure 6:
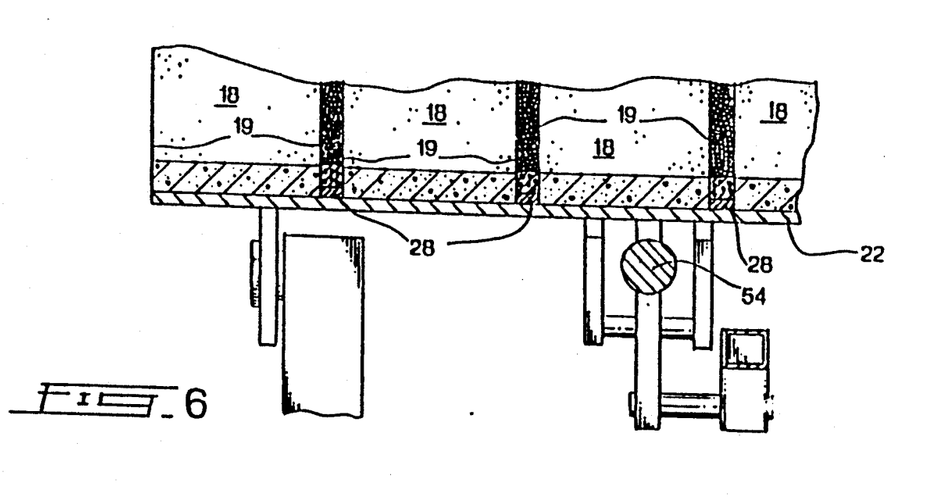
FIG. 6 is a cross-sectional view taken along lines 6—6 in FIG. 5.

The portions of the separators 28 that are located on the vertically extending part of the base plate 22 are ceramic magnets in order to create locally a magnetic field which will attract and retain thereto, against gravity, the particles of the granular material 19 used to fill the gaps between the brick slices 18. The remaining portion of the separators 28, located on the horizontally extending part of the base plate 22 are made of any other suitable material which does not generate a magnetic field because the gravity exerted on the granular material 19 does not tend to displace the particles from their proper position, as in the case of the vertical section of the base plate 20. However, for applications where neither section of the base plate 22 is in a horizontal position, the separators 28 may be entirely made of magnetic material, generating a suitable magnetic field attracting and holding the granular material 19 in place. It should be appreciated that other means to generate a magnetic field than permanent magnets may be employed. For example, appropriately positioned induction coils may be used to generate a powerful magnetic field which may be interrupted when not required simply by opening the coil circuits.

Figure 3:
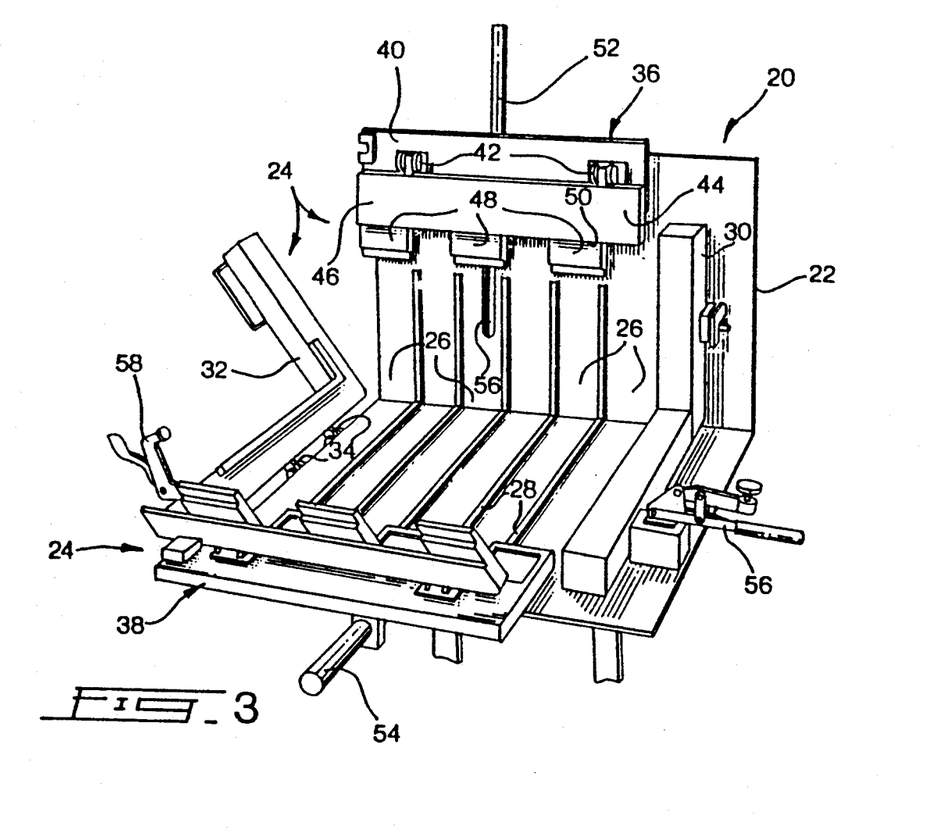
FIG. 3 is a perspective view of a fixture for manufacturing the panel shown in FIG. 1, the fixture being shown in the opened position.

The clamping assembly 24 comprises a fixed L-shaped abutment 30 which extends along one end recess 26 of the group of recesses 26. Opposite the fixed abutment 30 is mounted a movable L-shaped abutment 32 which extends along the other end recess 26 of the group. The movable abutment 32 is retained by means of hinges 34 to the horizontal section of the base plate 22. It will be appreciated that the abutment 32 is movable between an opened position, as shown in FIG. 3 to a closed position, illustrated in FIG. 4, and vice-versa. A locking mechanism, not illustrated in the drawings, is provided to retain the abutment 32 in the closed position.

The clamping assembly 24 further comprises abutment/core assemblies 36 and 38 associated with the vertical and the horizontal sections of the base plate 22, respectively. The abutment/core assembly 36 comprises a supporting plate element 40 whose bottom section is shaped to conform to a lateral edge of the panel 10. More particularly, the bottom section of the plate 40 defines three generally rectangular projections 41 spaced from one another by a distance corresponding approximately to the width of a brick slice.

On the plate 40 is mounted by means of hinges 42 a core assembly 44 comprising a supporting strip like element 46 from which extend downwardly three core members 48. At the junction between the cores members 48 and the strip-like element 46 is defined an L-shaped seat 50 whose function will become clear as the description proceeds. When the mold is in the closed position, the cores 48 are generally in register with the projections 41 on the plate-like member 40, there being a slight offset as best shown in FIG. 5. As a result of the slight misalignment existing between the cores 48 and the projections 41, recesses and corresponding projections will be formed in the bonding layer 16 which will allow to create a positive joint between adjacent panels 10. It should be appreciated that this feature is secondary to the invention as the type of joint to be formed will depend upon the specific application. Various types of joints have been developed by the past for building panels and it is within the reach of a man skilled in the art to adapt the apparatus and the method according to the invention to the type of joint desired.

The structure of the abutment/core assembly 38 is identical to the assembly 36 described above.

Figure 4:
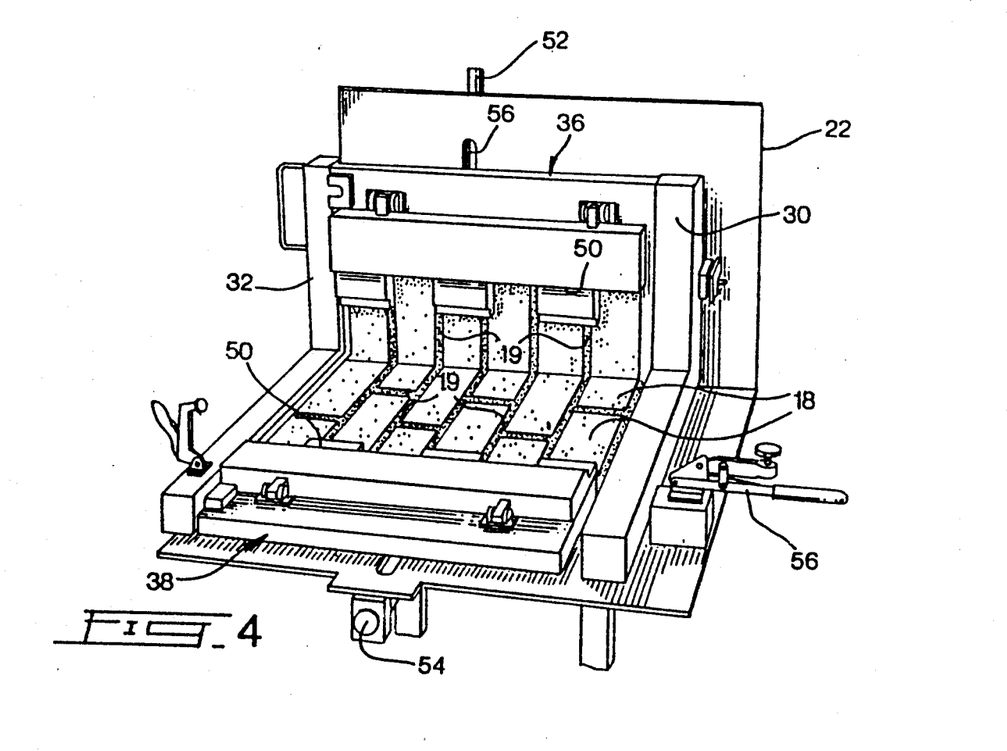
FIG. 4 shows the fixture of FIG. 3 in the closed position and filled with facing elements.

The assemblies 36 and 38 are movable toward and away the corner defined by the base plate 22 by means of a mechanical system which is not described in detail as it is not deemed to be essential to the invention. Suffice it to say that the assemblies 36 and 38 are connected to respective actuator rods 52 and 54 extending along the back of the plate 22, by means of fasteners extending through slots 56 (only one being shown in FIGS. 3 and 5) allowing the assemblies 36 and 38 to move as a result of a movement of the respective actuator rods. The assemblies 36 and 38 move in unison along perpendicular directions toward the corner of the base plate 22 to reach the closed position as illustrated in FIG. 4, and also they are moved in opposite directions to open the mold as shown in FIG. 3. The assembly 36 is shown in full lines in FIG. 9 in the closed position, the core assembly 44 being lifted up. In the same Figure, the assembly 36 is shown in dashed lines in the opened position.

The base plate 22 also comprises two manually operated clamps 56 and 58 for locking in place the backing layer 12 during the manufacture of the panel 10.

Figure 7:
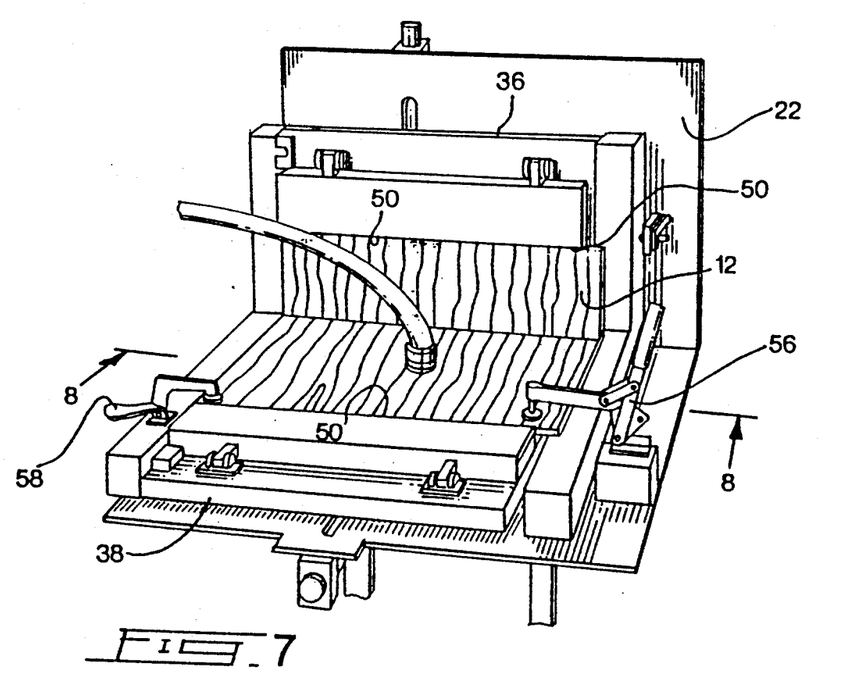
FIG. 7 is a perspective of the fixture according to the invention, showing the fixture in a closed position with the backing panel installed.
Figure 8:
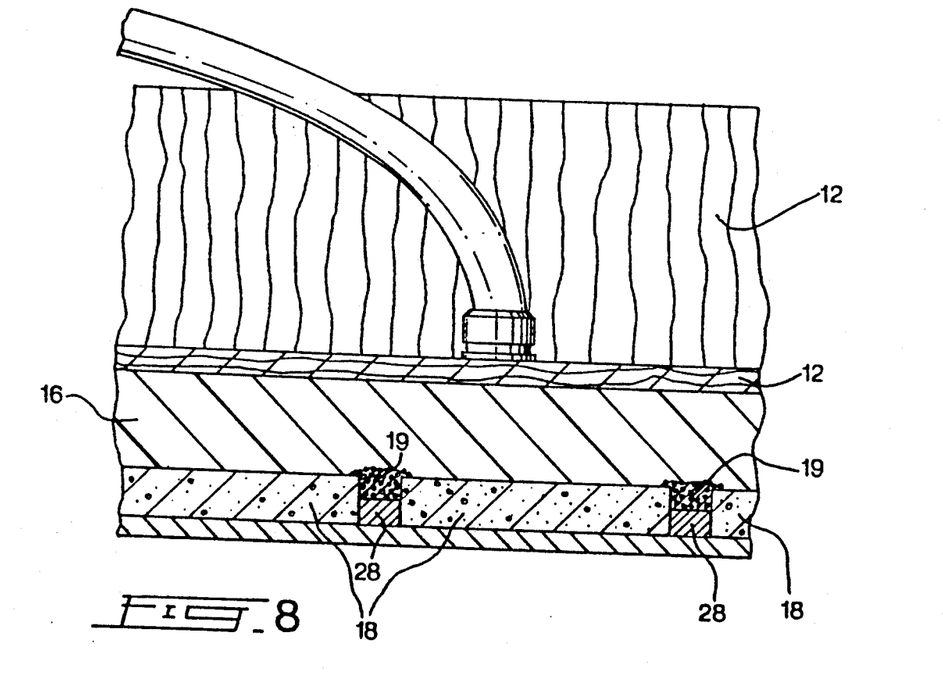
FIG. 8 is a cross-sectional view taken along lines 8—8 of FIG. 7.
Figure 9:
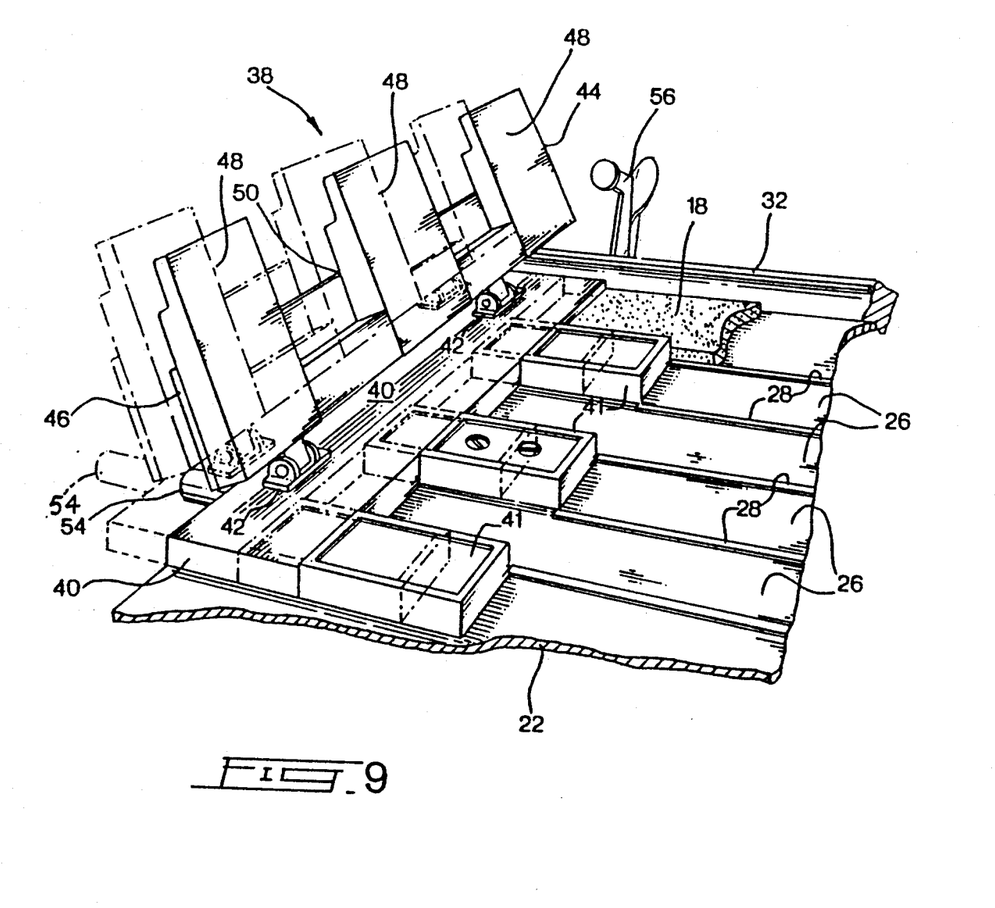
FIG. 9 is an enlarged partly sectional view of a clamping device used in the fixture shown in FIGS. 3 to 8.

The operation of the fixture 20 will be described in conjunction with process for manufacturing the panel 10. Assuming that the fixture 20 has been adequately cleaned and the clamping assembly 24 is in the opened position, the first step of the operation is to place the brick slices 18 in the recesses 26 of the base plate 22. When all the recesses have been filled, magnetically attractable granular material 19 is dispersed over the separators 28. Due to the magnetic field generated by the sections of the separators 28 on the vertically extending portion of the base plate 22, the granular material will be retained thereto against the effect of gravity. When a sufficient amount of granular material 19 has been provided so that it comes flush with the brick slices 18, the abutment clamping assemblies 36 and 38 are brought to the closed position by the respective actuator rods 52 and 54, and the core assemblies 44 are pivoted down, as shown by the arrow 55 in FIG. 5. A backing panel 12 is seated on these assemblies, as best illustrated in FIG. 7. It will be appreciated that two opposite edges of the panel are located in the seats 50. In this position, the backing panel 12 is located at a certain distance from the brick slices 18, this distance defining the thickness of the bonding layer 16 to be built.

The closure of the clamping assembly 24 is completed by closing the movable abutment 32 which is then locked in place. The manually operated clamps 56 and 58 are operated in order to press the backing board 12 downwardly so that it remains in position during the injection of the bonding layer 16.

Plastic material in fluid state is injected through an opening in the backing board 12 in order to fill the cavity in the fixture 20. The composition of the plastic material will vary according to the application. However, a certain number of properties must at all times be retained, such as the capability to adequately retain all the constituent elements of the panel 10 together and also it must have good insulation properties. It has been found that urethane foam is particularly advantageous in this regard.

As the plastic material cures, the brick slices 18, the particulate material therebetween and the backing board 12 will all be bonded together and it suffices to open the fixture in order to remove the panel 10.

The above description of a preferred embodiment should not be interpreted in any limiting manner since it is provided only at a possible form that the invention can take. This example may be refined and varied in several respects without departing from the spirit of the invention.

I claim:

1. A method for manufacturing a composite building panel comprising:
   a facing layer including a plurality of facing elements in a spaced apart relationship, and magnetically attractable particulate material disposed between said facing elements;
   a relatively rigid backing layer spaced apart from said facing layer; and
   an insulation layer between said facing and backing layers, said insulation layer constituting a bonding medium for retaining together said layers, said method comprising the steps of:
   a) placing facing elements in a facing elements holder including a plurality of recesses for receiving therein facing elements, and spacing means between said recesses for maintaining said facing elements in a spaced apart relationship;
   b) generating a magnetic field in the vicinity of said spacing means to attract and retain to said spacing means magnetically attractable particulate material;
   c) placing a backing layer in a spaced apart relationship to said facing elements in said facing elements holder; and
   d) flowing plastic material between said facing elements and said backing layer for building an insulation layer.

* * * * *